(12) United States Patent
Chen et al.

(10) Patent No.: US 11,586,218 B2
(45) Date of Patent: Feb. 21, 2023

(54) METHOD AND APPARATUS FOR POSITIONING VEHICLE, ELECTRONIC DEVICE AND STORAGE MEDIUM

(71) Applicant: Beijing Baidu Netcom Science and Technology Co., Ltd., Beijing (CN)

(72) Inventors: Qi Chen, Beijing (CN); Songtao Chang, Beijing (CN); Cong Chen, Beijing (CN); Yubin Wang, Beijing (CN); Youhao Li, Beijing (CN); Wenyang Chen, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 262 days.

(21) Appl. No.: 17/018,153

(22) Filed: Sep. 11, 2020

(65) Prior Publication Data
US 2021/0223789 A1 Jul. 22, 2021

(30) Foreign Application Priority Data
Jan. 20, 2020 (CN) .......................... 202010067385.9

(51) Int. Cl.
*G05D 1/00* (2006.01)
*G05D 1/02* (2020.01)
(Continued)

(52) U.S. Cl.
CPC ......... *G05D 1/0274* (2013.01); *G05D 1/0246* (2013.01); *G06N 3/04* (2013.01); *G06V 20/56* (2022.01)

(58) Field of Classification Search
CPC ............. B60W 60/0025; B60W 40/06; B60W 2552/00; B60W 2420/42; G06V 10/462;
(Continued)

(56) References Cited

U.S. PATENT DOCUMENTS 9,587,948 B2 3/2017 Schuller
2007/0233380 A1 10/2007 Yutaka
(Continued)

FOREIGN PATENT DOCUMENTS

CN 109720340 A 5/2019
JP 1993079848 A 3/1993
(Continued)

*Primary Examiner* — Tyler J Lee
*Assistant Examiner* — Tiffany P Ohman
(74) *Attorney, Agent, or Firm* — Nixon Peabody LLP

(57) ABSTRACT

A method and apparatus for positioning a vehicle. The method may include: acquiring an identification element and non-identification elements of a current vehicle. The method can further include matching the identification element of the current vehicle with position elements in a high-precision map to determine an initial position of the current vehicle. The method can further include using at least one position element in the high-precision map to perform observational constraints on the non-identification elements of the current vehicle to acquire position elements corresponding to the non-identification elements of the current vehicle. The method can further include adjusting the initial position of the current vehicle using the position elements corresponding to the non-identification elements of the current vehicle to obtain a target position of the current vehicle.

12 Claims, 4 Drawing Sheets

(51) Int. Cl.
*G06N 3/04* (2023.01)
*G06V 20/56* (2022.01)

(58) Field of Classification Search
CPC .............. G06V 20/588; G06V 20/647; G01C 21/3407; G06K 9/6257; G06N 3/04; G06N 3/08
USPC ......................................................... 701/25
See application file for complete search history.

(56) References Cited

U.S. PATENT DOCUMENTS

| | | |
|---|---|---|
| 2017/0122754 A1 | 5/2017 | Konishi et al. |
| 2018/0045519 A1 | 2/2018 | Ghadiok et al. |
| 2018/0188045 A1* | 7/2018 | Wheeler ................. H04L 67/52 |
| 2018/0188742 A1 | 7/2018 | Wheeler |
| 2019/0154842 A1 | 5/2019 | Adachi |
| 2019/0271549 A1 | 9/2019 | Zhang et al. |
| 2019/0340775 A1* | 11/2019 | Lee ......................... G05D 1/024 |
| 2020/0007844 A1 | 1/2020 | Seo et al. |
| 2020/0372285 A1* | 11/2020 | Adams ................. G06V 20/582 |
| 2021/0370970 A1 | 12/2021 | Wendong et al. |

FOREIGN PATENT DOCUMENTS

| | | |
|---|---|---|
| JP | 2007263385 A | 10/2007 |
| JP | 2007263835 A | 10/2007 |
| JP | 2017-083446 A | 5/2018 |
| JP | 2019527832 A | 10/2019 |
| KR | 10-2019-0089791 A | 7/2019 |
| KR | 20210042856 A | 4/2021 |

\* cited by examiner

METHOD AND APPARATUS FOR POSITIONING VEHICLE, ELECTRONIC DEVICE AND STORAGE MEDIUM

CROSS-REFERENCE TO RELATED APPLICATIONS

This application claims priority to Chinese Patent Application No. 202010067385.9, filed on Jan. 20, 2020, titled "Method and apparatus for positioning vehicle, electronic device, and storage medium," which is hereby incorporated by reference in its entirety.

TECHNICAL FIELD

The present disclosure relates to the field of smart vehicles, further relates to autonomous driving technology, and specifically to a method and apparatus for positioning a vehicle, an electronic device, and a storage medium.

BACKGROUND

Surround-view visual positioning technology refers to stitching several fisheye images around a vehicle body into a surround-view image, detecting visual positioning elements, such as parking space number, parking space corner, lane line, ground traffic indication information (for example, ground arrow, zebra crossing, etc.) in the surround-view image by a deep neural network model, and performing data association and matching with a global high-precision semantic map built in advance, which can provide effective observation for a visual inertial odometer installed in the vehicle, improve a positioning accuracy of autonomous vehicles and a positioning accuracy of vehicles during in and out of garage and cruising in the garage and other application scenarios.

At present, automated parking positioning technology is generally solved using the following solutions: 1) A fisheye-based autonomous vehicle visual element positioning solution: this solution requires four fisheye sensors to be installed on the vehicle body, including a front fisheye sensor, a left fisheye sensor, a rear fisheye sensor, and a right fisheye sensor, uses the four fisheye sensors to collect visual elements around the vehicle body, including: parking space, lane line, ground arrow and other information, restores true positions of the visual elements by removing distortion, and then sends the visual elements to the backend at a certain frequency for processing and positions a vehicle body position. 2) A front wide-angle based autonomous vehicle visual positioning solution: this solution uses a front wide-angle camera, which is generally installed in the front of the vehicle body to observe visual elements in front of the vehicle body, and may identify information such as parking space, lane line, ground arrow, and artificial marker, then send the visual elements to the backend for fusion positioning. 3) A vision-based surround-view local positioning method: in the autonomous vehicle assisted driving in and out of the garage, a frequently used solution is to stitch four fisheye images into a surround-view image, and then identify visual positioning elements from the surround-view image. This method may effectively remove the effects of distortion, improve the accuracy, which may effectively acquire the relative position of the vehicle body and the visual positioning elements.

The three vehicle positioning solutions in the related art are to position the vehicle by acquiring the positioning elements of the vehicle, but the positioning elements can only locally position the vehicle and cannot globally position the vehicle, that is: can only detect the relative position of the vehicle and surrounding objects, and cannot detect the latitude and longitude coordinates of the vehicle.

SUMMARY

In view of this, embodiments of the present disclosure provide a method and apparatus for positioning a vehicle, an electronic device, and a storage medium, which may accurately determine the latitude and longitude coordinates of the vehicle, and effectively improve a positioning accuracy.

In a first aspect, an embodiment of the present disclosure provides a method for positioning a vehicle, the method including: acquiring an identification element and non-identification elements of a current vehicle; matching the identification element of the current vehicle with position elements in a high-precision map to determine an initial position of the current vehicle; sing at least one position element in the high-precision map to perform observational constraints on the non-identification elements of the current vehicle to acquire position elements corresponding to the non-identification elements of the current vehicle; and adjusting the initial position of the current vehicle using the position elements corresponding to the non-identification elements of the current vehicle to obtain a target position of the current vehicle.

The above embodiment has the following advantages or beneficial effects: the above embodiment may determine the initial position of the current vehicle by matching the identification element of the current vehicle with the position elements in the high-precision map; then adjust the initial position of the current vehicle using the position elements corresponding to the non-identification elements of the current vehicle to obtain the target position of the current vehicle, thereby achieving the purpose of accurately determining the latitude and longitude coordinates of the vehicle. The three vehicle positioning solutions in the related art all position the vehicle by acquiring the positioning elements of the vehicle, but the positioning elements can only position the vehicle locally, and cannot position the vehicle globally, that is: only the relative position of the vehicle and surrounding objects can be detected, but the latitude and longitude coordinates of the vehicle cannot be detected. Because the present disclosure adopts the technical means of determining the initial position using the identification element and adjusting the initial position using the non-identification elements, it overcomes the technical problem that it can only position the vehicle locally and cannot position the vehicle globally in the related art, and thus achieving the technical effect of accurately determining the latitude and longitude coordinates of the vehicle and effectively improving a positioning accuracy.

In some embodiments, the acquiring the identification element and non-identification elements of the current vehicle, includes: collecting environment images of the current vehicle in four directions using four fisheye sensors provided on the current vehicle; wherein, the four fisheye sensors on the current vehicle are respectively provided in the four directions of front, rear, left, and right of the current vehicle; stitching the environment images of the current vehicle in the four directions collected using the fisheye sensors into a surround-view fisheye image; and inputting the surround-view fisheye image into a deep neural network, and outputting the identification element and the non-identification elements of the current vehicle through the deep neural network.

The above embodiments have the following advantages or beneficial effects: the above embodiments may collect environment images of the current vehicle in four directions using four fisheye sensors, stitch the four environment images into a surround-view fisheye image, thereby acquiring the identification element and the non-identification elements of the current vehicle. Identifying the surround-view fisheye sensors through the deep neural network, the identification element and the non-identification elements of the current vehicle may be accurately acquired.

In some embodiments, the matching the identification element of the current vehicle with position elements in the high-precision map to determine the initial position of the current vehicle, includes: determining at least one reference initial position in the high-precision map based on the identification element of the current vehicle; and calculating a matching degree between the identification element of the current vehicle and each of the at least one reference initial position, and determining a reference initial position having a highest matching degree as the initial position of the current vehicle.

The above embodiments have the following advantages or beneficial effects: by calculating the matching degree between the identification element of the current vehicle and each of the reference initial positions, the above embodiments may accurately determine the initial position of the current vehicle. The present disclosure may use any type of matching degree algorithm, which is not limited herein. Manual participation is not required when calculating the matching degree, and the reference initial position having the highest matching degree may be accurately obtained, so that the initial position of the current vehicle may be accurately determined.

In some embodiments, the using at least one position element in the high-precision map to perform observational constraints on the non-identification elements of the current vehicle to acquire position elements corresponding to the non-identification elements of the current vehicle, includes: electing a non-identification element in the non-identification elements of the current vehicle as a current non-identification element, and determining at least one position element corresponding to the current non-identification element in the high-precision map based on the current non-identification element; and performing point and point observational constraints on the current non-identification element and the corresponding position element, if the current non-identification element is a point element and the corresponding position element is a point original element, to acquire the position element corresponding to the current non-identification element; or, performing point and line observational constraints on the current non-identification element and the corresponding position element, if the current non-identification element is a line element and the corresponding position element is a point original element, or, if the current non-identification element is a point element and the corresponding position element is a point and line element, to acquire the position element corresponding to the current non-identification element; and repeatedly performing above operations until the position elements corresponding to the non-identification elements of the current vehicle are acquired.

The above embodiments have the following advantages or beneficial effects: through the point and point observational constraints or the point and line observational constraints, the above embodiments may accurately acquire the position elements corresponding to the non-identification elements of the current vehicle, so that the position elements corresponding to the non-identification elements of the current vehicle may be used to adjust the initial position of the current vehicle to obtain the target position of the current vehicle.

In some embodiments, the method further includes: collecting inertial measurement data and wheel speed data of the current vehicle using an inertial measurement unit sensor and a wheel speed sensor provided on the current vehicle; and adjusting the target position of the current vehicle using the inertial measurement data and the wheel speed data of the current vehicle, to obtain a final position of the current vehicle.

The above embodiments have the following advantages or beneficial effects: the above embodiment may also collect inertial measurement data and wheel speed data using the inertial measurement unit sensor and the wheel speed sensor, then further adjust the target position of the current vehicle using the inertial measurement data and the wheel speed data of the current vehicle, to obtain the final position of the current vehicle. In this regard, the accuracy of the final position of the current vehicle may be improved.

In a second aspect, an embodiment of the present disclosure provides an apparatus for positioning a vehicle, the apparatus including: an acquisition module, a determination module, a constraint module and an adjusting module; where: the acquisition module is configured to acquire an identification element and non-identification elements of a current vehicle; the determination module is configured to match the identification element of the current vehicle with position elements in a high-precision map to determine an initial position of the current vehicle; the constraint module is configured to use at least one position element in the high-precision map to perform observational constraints on the non-identification elements of the current vehicle to acquire position elements corresponding to the non-identification elements of the current vehicle; and the adjusting module is configured to adjust the initial position of the current vehicle using the position elements corresponding to the non-identification elements of the current vehicle to obtain a target position of the current vehicle.

In some embodiments, the acquisition module includes: a collection submodule and an acquisition submodule; where, the collection submodule is configured to collect environment images of the current vehicle in four directions using four fisheye sensors provided on the current vehicle; wherein, the four fisheye sensors on the current vehicle are respectively provided in the four directions of front, rear, left, and right of the current vehicle; and the acquisition submodule is configured to stitch the environment images of the current vehicle in the four directions collected using the fisheye sensors into a surround-view fisheye image; and input the surround-view fisheye image into a deep neural network, and output the identification element and the non-identification elements of the current vehicle through the deep neural network.

In some embodiments, the determination module is configured to determine at least one reference initial position in the high-precision map based on the identification element of the current vehicle; and calculate a matching degree between the identification element of the current vehicle and each of the at least one reference initial position, and determine a reference initial position having a highest matching degree as the initial position of the current vehicle.

In some embodiments, the constraint module includes: a determination submodule and a constraint submodule; where, the determination submodule, is configured to select a non-identification element in the non-identification elements of the current vehicle as a current non-identification element, and determine at least one position element corresponding to the current non-identification element in the high-precision map based on the current non-identification element; and the constraint submodule, is configured to perform point and point observational constraints on the current non-identification element and the corresponding position element, if the current non-identification element is a point element and the corresponding position element is a point original element, to acquire the position element corresponding to the current non-identification element; or, perform point and line observational constraints on the current non-identification element and the corresponding position element, if the current non-identification element is a line element and the corresponding position element is a point original element, or, if the current non-identification element is a point element and the corresponding position element is a point and line element, to acquire the position element corresponding to the current non-identification element; and repeatedly perform above operations until the position elements corresponding to the non-identification elements of the current vehicle are acquired.

In some embodiments, the acquisition module, is further configured to collect inertial measurement data and wheel speed data of the current vehicle respectively using an inertial measurement unit sensor and a wheel speed sensor provided on the current vehicle; and the adjusting module, is further configured to adjust the target position of the current vehicle using the inertial measurement data and the wheel speed data of the current vehicle, to obtain a final position of the current vehicle.

In a third aspect, an embodiment of the present disclosure provides an electronic device, including: at least one processor; and a memory, communicatively connected to the at least one processor; where, the memory stores instructions executable by the at least one processor, the instructions, when executed by the at least one processor, cause the at least one processor to perform the method for positioning a vehicle according to any embodiment of the present disclosure.

In a fourth aspect, an embodiment of the present disclosure provides a non-transitory computer readable storage medium, storing computer instructions, the computer instructions, being used to cause a computer to perform the method for positioning a vehicle according to any embodiment of the present disclosure.

An embodiment in the above disclosure has the following advantages or beneficial effects: the method and apparatus for positioning a vehicle, the electronic device, and the storage medium proposed in the present disclosure, first acquire an identification element and non-identification elements of a current vehicle; then match the identification element of the current vehicle with position elements in a high-precision map to determine an initial position of the current vehicle; next use at least one position element in the high-precision map to perform observational constraints on the non-identification elements of the current vehicle to acquire position elements corresponding to the non-identification elements of the current vehicle, and adjust the initial position of the current vehicle using the position elements corresponding to the non-identification elements of the current vehicle to obtain a target position of the current vehicle. That is, the present disclosure may determine the initial position of the current vehicle by matching the identification element of the current vehicle with the position elements in the high-precision map; then adjust the initial position of the current vehicle using the position elements corresponding to the non-identification elements of the current vehicle to obtain the target position of the current vehicle, thereby achieving the purpose of accurately determining the latitude and longitude coordinates of the vehicle. The three vehicle positioning solutions in the related art all position the vehicle by acquiring the positioning elements of the vehicle, but the positioning elements can only position the vehicle locally, and cannot position the vehicle globally, that is: only the relative position of the vehicle and surrounding objects can be detected, but the latitude and longitude coordinates of the vehicle cannot be detected. Because the present disclosure adopts the technical means of determining the initial position using the identification element and adjusting the initial position using the non-identification elements, it overcomes the technical problem that it can only position the vehicle locally and cannot position the vehicle globally in the related art, and thus achieving the technical effect of accurately determining the latitude and longitude coordinates of the vehicle and effectively improving a positioning accuracy; in addition, the technical solution of the embodiments of the present disclosure is simple and convenient to implement, easy to popularize, and has a wider application range.

Other effects of the above alternative methods will be described below in conjunction with specific embodiments.

BRIEF DESCRIPTION OF THE DRAWINGS

The accompanying drawings are used to better understand the present solution, and do not constitute a limitation on the present disclosure.

DETAILED DESCRIPTION OF EMBODIMENTS

The following describes example embodiments of the present disclosure in conjunction with accompanying drawings, which includes various details of embodiments of the present disclosure to facilitate understanding, and they should be considered as merely exemplary. Therefore, those of ordinary skill in the art should recognize that various changes and modifications may be made to the embodiments described herein without departing from the scope and spirit of the present disclosure. Also, for clarity and conciseness, descriptions of well-known functions and structures are omitted in the following description.

First Embodiment

Figure 1:
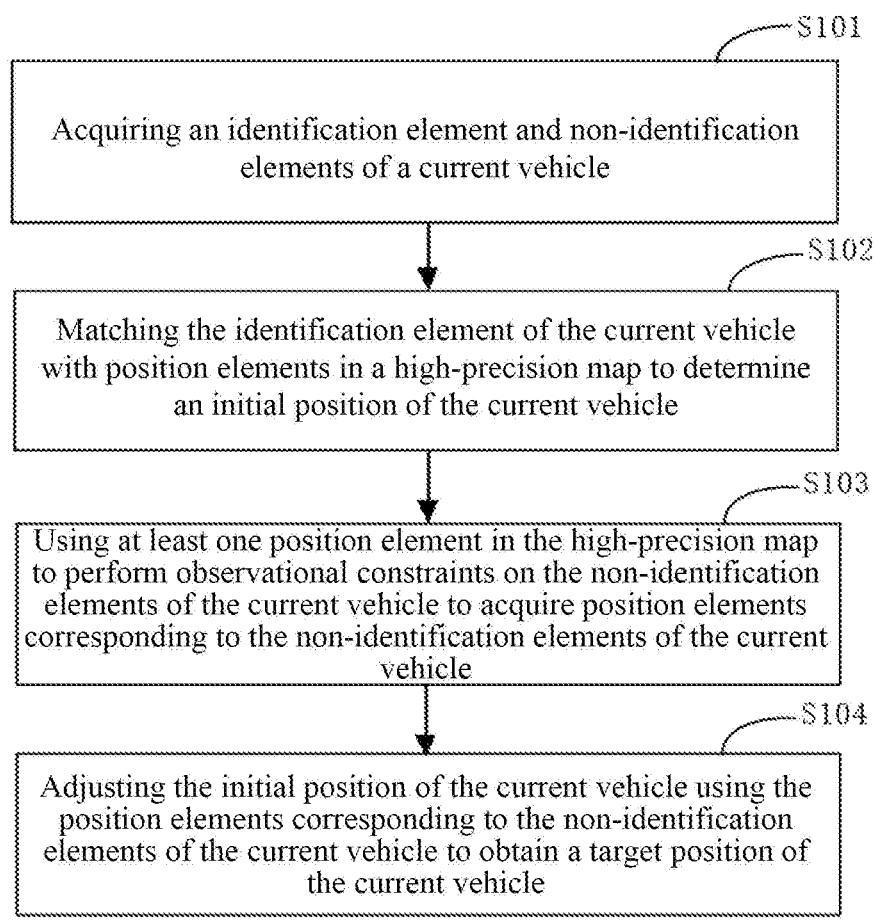
FIG. 1 is a schematic flowchart of a method for positioning a vehicle according to a first embodiment of the present disclosure.

FIG. 1 is a schematic flowchart of a method for positioning a vehicle according to the first embodiment of the present disclosure. The method may be performed by an apparatus for positioning a vehicle or an electronic device. The apparatus or electronic device may be implemented by software and/or hardware. The apparatus or electronic device may be integrated in any smart device having a network communication function. As shown in FIG. 1, the method for positioning a vehicle may include the following steps.

S101, acquiring an identification element and non-identification elements of a current vehicle.

In a specific embodiment of the present disclosure, the electronic device may acquire the identification element and the non-identification elements of the current vehicle. Specifically, the electronic device may collect environment images of the current vehicle in four directions using four fisheye sensors provided on the current vehicle; where, the four fisheye sensors on the current vehicle are respectively provided in the four directions of front, rear, left, and right of the current vehicle; stitch the environment images of the current vehicle in the four directions collected using the fisheye sensors into a surround-view fisheye image; and input the surround-view fisheye image into a deep neural network, and output the identification element and the non-identification elements of the current vehicle through the deep neural network.

Preferably, in a specific embodiment of the present disclosure, the identification element of the current vehicle may be: parking space ID; and the non-identification elements of the current vehicle may be: parking spot, parking line, lane line, ground traffic sign information and other information. The camera lens of the above fisheye sensor is an ultra-wide-angle camera, which may capture environmental information within a certain viewing angle range of the current vehicle in the four directions: front, rear, left, and right. For example, the fisheye sensors installed in the four directions of the current vehicle (abbreviated as: front fisheye sensor, rear fisheye sensor, left fisheye sensor and right fisheye sensor) may capture the parking space ID of the current vehicle and the parking spot, parking line, lane line, and ground traffic sign information of the current vehicle in the four directions. In the present embodiment, the specific positions of installation of the front fisheye sensor, the rear fisheye sensor, the left fisheye sensor, and the right fisheye sensor may be set according to actual needs, which is not further limited herein.

S102, matching the identification element of the current vehicle with position elements in a high-precision map to determine an initial position of the current vehicle.

In a specific embodiment of the present disclosure, the electronic device may match the identification element of the current vehicle with the position elements in the high-precision map to determine the initial position of the current vehicle. Specifically, the electronic device may first determine at least one reference initial position in the high-precision map based on the identification element of the current vehicle, then calculate a matching degree between the identification element of the current vehicle and each of the at least one reference initial position, and determine a reference initial position having the highest matching degree as the initial position of the current vehicle.

S103, using at least one position element in the high-precision map to perform observational constraints on the non-identification elements of the current vehicle to acquire position elements corresponding to the non-identification elements of the current vehicle.

In a specific embodiment of the present disclosure, the electronic device may use the at least one position element in the high-precision map to perform observational constraints on the non-identification elements of the current vehicle to acquire the position elements corresponding to the non-identification elements of the current vehicle. Specifically, the electronic device may select a non-identification element in the non-identification elements of the current vehicle as a current non-identification element, and determine at least one position element corresponding to the current non-identification element in the high-precision map based on the current non-identification element; perform point and point observational constraints on the current non-identification element and the corresponding position element, if the current non-identification element is a point element and the corresponding position element is a point original element, to acquire the position element corresponding to the current non-identification element; perform point and line observational constraints on the current non-identification element and the corresponding position element, if the current non-identification element is a line element and the corresponding position element is a point original element, or, if the current non-identification element is a point element and the corresponding position element is a point and line element, to acquire the position element corresponding to the current non-identification element; and repeatedly perform above operations until the position elements corresponding to the non-identification elements of the current vehicle are acquired.

S104, adjusting the initial position of the current vehicle using the position elements corresponding to the non-identification elements of the current vehicle to obtain a target position of the current vehicle.

In a specific embodiment of the present disclosure, the electronic device may adjust the initial position of the current vehicle using the position elements corresponding to the non-identification elements of the current vehicle to obtain the target position of the current vehicle.

The method for positioning a vehicle proposed in the embodiment of the present disclosure, first acquires an identification element and non-identification elements of a current vehicle; then matches the identification element of the current vehicle with position elements in a high-precision map to determine an initial position of the current vehicle; next uses at least one position element in the high-precision map to perform observational constraints on the non-identification elements of the current vehicle to acquire position elements corresponding to the non-identification elements of the current vehicle, and adjusts the initial position of the current vehicle using the position elements corresponding to the non-identification elements of the current vehicle to obtain a target position of the current vehicle. That is, the present disclosure may determine the initial position of the current vehicle by matching the identification element of the current vehicle with the position elements in the high-precision map; then adjust the initial position of the current vehicle using the position elements corresponding to the non-identification elements of the current vehicle to obtain the target position of the current vehicle, thereby achieving the purpose of accurately determining the latitude and longitude coordinates of the vehicle. The three vehicle positioning solutions in the related art all position the vehicle by acquiring the positioning elements of the vehicle, but the positioning elements can only position the vehicle locally, and cannot position the vehicle globally, that is: only the relative position of the vehicle and surrounding objects can be detected, but the latitude and longitude coordinates of the vehicle cannot be detected. Because the present disclosure adopts the technical means of determining the initial position using the identification element and adjusting the initial position using the non-identification elements, it overcomes the technical problem that it can only position the vehicle locally and cannot position the vehicle globally in the related art, and thus achieving the technical effect of accurately determining the latitude and longitude coordinates of the vehicle and effectively improving a positioning accuracy; in addition, the technical solution of the embodiments of the present disclosure is simple and convenient to implement, easy to popularize, and has a wider application range.

Second Embodiment

Figure 2:
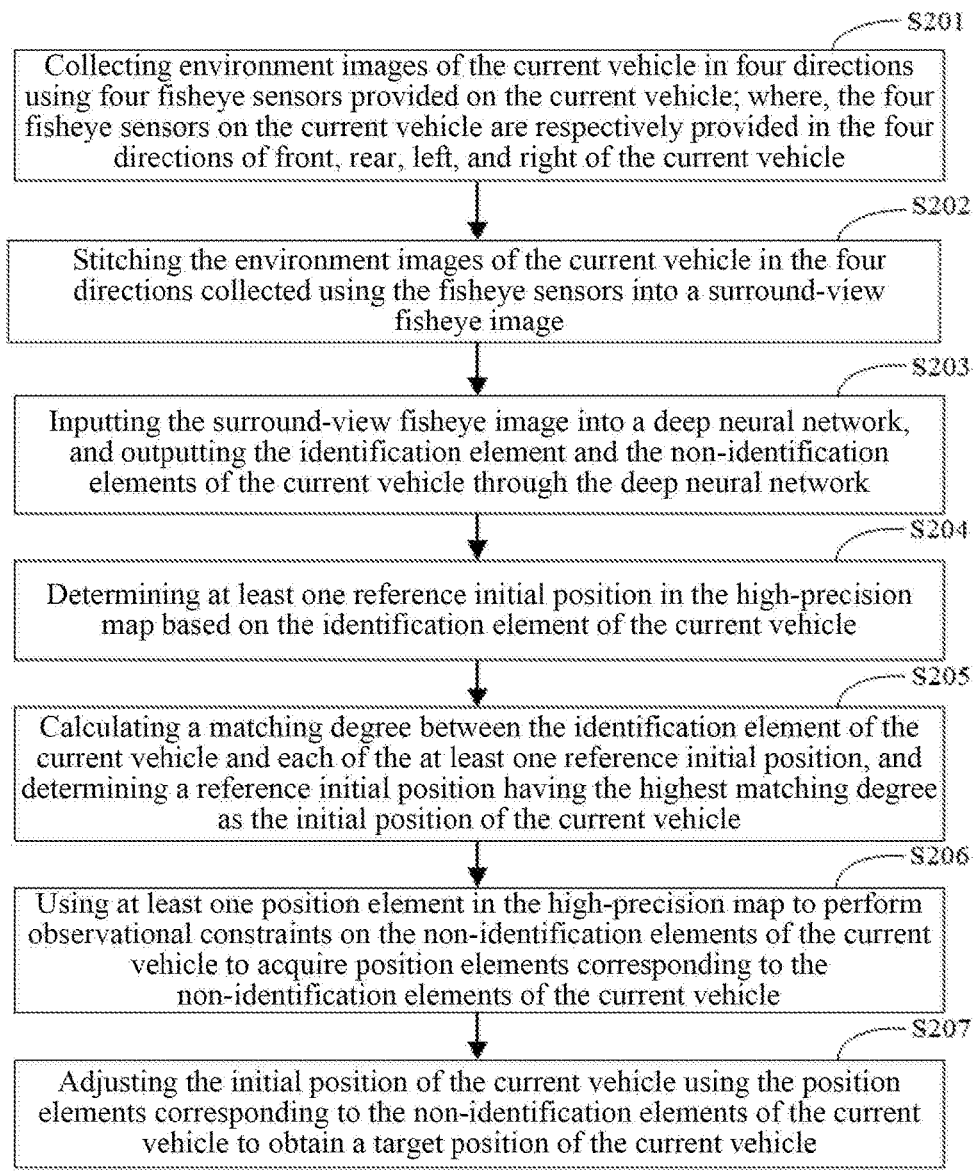
FIG. 2 is a schematic flowchart of the method for positioning a vehicle according to a second embodiment of the present disclosure.

FIG. 2 is a schematic flowchart of the method for positioning a vehicle according to the second embodiment of the present disclosure. As shown in FIG. 2, the method for positioning a vehicle may include the following steps.

S201, collecting environment images of the current vehicle in four directions using four fisheye sensors provided on the current vehicle; where, the four fisheye sensors on the current vehicle are respectively provided in four directions of front, rear, left, and right of the current vehicle.

In a specific embodiment of the present disclosure, the electronic device may collect the environment images of the current vehicle in the four directions using the four fisheye sensors provided on the current vehicle; where, the four fisheye sensors on the current vehicle are respectively provided in the four directions of front, rear, left, and right of the current vehicle.

S202, stitching the environment images of the current vehicle in the four directions collected using the fisheye sensors into a surround-view fisheye image.

In a specific embodiment of the present disclosure, the electronic device may stitch the environment images of the current vehicle in the four directions collected using the fisheye sensors into the surround-view fisheye image. Specifically, since the maximum shooting range of the fisheye sensor is 180°, an environment image collected by the front fisheye sensor and environment images collected by the left fisheye sensor and the right fisheye sensor may have overlapping areas, and an environment image collected by the rear fisheye sensor and environment images collected by the left fisheye sensor and the right fisheye sensor may also have overlapping areas; an environment image collected by the left fisheye sensor and environment images collected by the front fisheye sensor and the rear fisheye sensor may also have overlapping areas; and an environment image collected by the right fisheye sensor and environment images collected by the front fisheye sensor and the rear fisheye sensor may also have overlapping areas. Therefore, the electronic device may stitch the environment images collected by the fisheye sensors based on positional relationships between the four environment images collected by the four fisheye sensors to obtain the surround-view fisheye image corresponding to the four environment images.

S203, inputting the surround-view fisheye image into a deep neural network, and outputting the identification element and the non-identification elements of the current vehicle through the deep neural network.

In a specific embodiment of the present disclosure, the electronic device may input the surround-view fisheye image into the deep neural network, and output the identification element and the non-identification elements of the current vehicle through the deep neural network. Specifically, the deep neural network may identify the parking space ID in the surround-view fisheye image, and output the parking space ID of the current vehicle; and may also identify the parking spot, parking line, lane line, ground traffic sign information and other information in the surround-view fisheye image, and output the parking spot, parking line, lane line, ground traffic sign information and other information of the current vehicle.

S204, determining at least one reference initial position in the high-precision map based on the identification element of the current vehicle.

In a specific embodiment of the present disclosure, the electronic device may determine the at least one reference initial position in the high-precision map based on the identification element of the current vehicle. Specifically, the electronic device may determine a reference position area in the high-precision map based on the parking space ID of the current vehicle, and the reference position area may be a preset regular shape; and then determine at least one reference initial position in the reference position area; and the reference initial positions may reflect various possibilities of the pose of the current vehicle.

Step 205, calculating a matching degree between the identification element of the current vehicle and each of the at least one reference initial position, and determining a reference initial position having the highest matching degree as the initial position of the current vehicle.

In a specific embodiment of the present disclosure, the electronic device may calculate the matching degree between the identification element of the current vehicle and each of the at lest one reference initial position, and determine the reference initial position having the highest matching degree as the initial position of the current vehicle. Specifically, the electronic device may input the identification element of the current vehicle and the reference initial positions into the deep neural network; output the initial position of the current vehicle through the deep neural network; and the initial position may reflect the maximum possibility of the pose of the current vehicle.

Step 206, using at least one position element in the high-precision map to perform observational constraints on the non-identification elements of the current vehicle to acquire position elements corresponding to the non-identification elements of the current vehicle.

In a specific embodiment of the present disclosure, the electronic device may use the at least one position element in the high-precision map to perform observational constraints on the non-identification elements of the current vehicle to acquire the position elements corresponding to the non-identification elements of the current vehicle. Specifically, the electronic device may select a non-identification element in the non-identification elements of the current vehicle as a current non-identification element, and determine at least one position element corresponding to the current non-identification element in the high-precision map based on the current non-identification element; perform point and point observational constraints on the current non-identification element and the corresponding position element, if the current non-identification element is a point element and the corresponding position element is a point original element, to acquire the position element corresponding to the current non-identification element; perform point and line observational constraints on the current non-identification element and the corresponding position element, if the current non-identification element is a line element and the corresponding position element is a point original element, or, if the current non-identification element is a point element and the corresponding position element is a point and line element, to acquire the position element corresponding to the current non-identification element; and repeatedly perform above operations until the position elements corresponding to the non-identification elements of the current vehicle are acquired.

Figure 3:
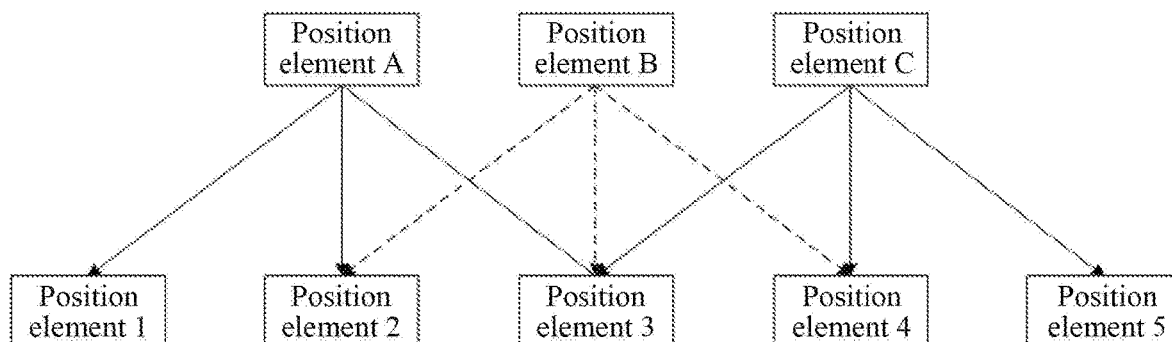
FIG. 3 is a schematic diagram of an association of position elements according to the second embodiment of the present disclosure.

FIG. 3 is a schematic diagram of an association of position elements according to the second embodiment of the present disclosure. As shown in FIG. 3, assuming that the position elements sensed by the front fisheye sensor, the rear fisheye sensor, the left fisheye sensor and the right fisheye sensor (the position elements here include: the identification element and the non-identification elements of the current vehicle) may include: position element A, position element B, and position element C; and assuming that the position elements in the high-precision map may include: position element 1, position element 2, position element 3, position element 4, and position element 5; where, position element A is connected to position element 1, position element 2, and position element 3, respectively, indicating that position element A may be associated with position element 1, position element 2, and position element 3; position element B is connected to position element 2, position element 3, and position element 4, respectively, indicating that position element B may be associated with position element 2, position element 3, and position element 4; and position element C is connected to position element 3, position element 4, and position element 5, respectively, indicating that position element C may be associated with position element 3, position element 4, and position element 5. In this step, the electronic device may calculate association parameters of position element A and position element 1, position element 2, and position element 3; may also calculate association parameters of position element B and position element 2, position element 3, and position element 4; and may also calculate association parameters of position element C and position element 3, position element 4, and position element 5. The association parameters here include, but are not limited to: average overlapping area ratio, perimeter ratio, and 3D position distance.

S207, adjusting the initial position of the current vehicle using the position elements corresponding to the non-identification elements of the current vehicle to obtain a target position of the current vehicle.

In a specific embodiment of the present disclosure, the electronic device may adjust the initial position of the current vehicle using the position elements corresponding to the non-identification elements of the current vehicle to obtain the target position of the current vehicle. For example, assuming that the initial position of the current vehicle is (x, y, z) and the direction is: the front of the vehicle is aligned with true north; but the lane line sensed by the front fisheye sensor is 30 degrees to the west, in this step, the electronic device may adjust the orientation of the initial position of the current vehicle from true north to 30 degrees west.

Preferably, in a specific embodiment of the present disclosure, the electronic device may also collect inertial measurement data and wheel speed data of the current vehicle respectively using an inertial measurement unit sensor and a wheel speed sensor provided on the current vehicle; and then adjust the target position of the current vehicle using the inertial measurement data and the wheel speed data of the current vehicle, to obtain a final position of the current vehicle.

In a specific embodiment of the present disclosure, the current vehicles may be installed with: a surround-view perception module, an initialization positioning module, a data association module and a multi-sensor fusion module; where, for the surround-view perception module: this module performs hardware synchronization exposure to the front, left, right, and rear four fisheye sensors, then stitches environment images collected by the four fisheye sensors into a surround-view fisheye image, and then sends the image to the depth neural network, and outputs position elements such as parking space ID, parking spot, parking line, lane line, ground traffic sign information. For the initialization positioning module: this module provides an initial pose of the current vehicle in the high-precision map. The input is the perceptually identified identification element and the non-identification elements as well as the high-precision map. The particle filter algorithm is used to first randomly spread particles (that is, the non-identification elements of the current vehicle) near the location of the parking space ID in the high-precision map, continuously update the weights of the particles, and re-spread particles where the particle weight is high, thus obtaining a particle concentration area having the highest weight by looping, that is, the initial positioning of the autonomous vehicle is obtained. For the data association module: based on the current pose of the vehicle body and natural elements of the non-identification elements identified by the surround-view perception, this module associates the two to provide continuous observation for backend status estimation and corrects an odometer error. For the multi-sensor fusion module: the input of this module is observation data of the inertial measurement unit sensor, the wheel speed sensor and the high-precision map. The function of the multi-sensor fusion module is to estimate the most accurate and reliable current vehicle body pose based on different input sources. Specifically, the present disclosure may flexibly adopt the Kalman filter algorithm based on multi-status constraints and the optimization algorithm based on least squares estimation, based on the hardware computing power of the autonomous vehicle platform.

The method for positioning a vehicle proposed in the embodiment of the present disclosure, first acquires an identification element and non-identification elements of a current vehicle; then matches the identification element of the current vehicle with position elements in a high-precision map to determine an initial position of the current vehicle; next uses at least one position element in the high-precision map to perform observational constraints on the non-identification elements of the current vehicle to acquire position elements corresponding to the non-identification elements of the current vehicle, and adjusts the initial position of the current vehicle using the position elements corresponding to the non-identification elements of the current vehicle to obtain a target position of the current vehicle. That is, the present disclosure may determine the initial position of the current vehicle by matching the identification element of the current vehicle with the position elements in the high-precision map; then adjust the initial position of the current vehicle using the position elements corresponding to the non-identification elements of the current vehicle to obtain the target position of the current vehicle, thereby achieving the purpose of accurately determining the latitude and longitude coordinates of the vehicle. The three vehicle positioning solutions in the related art all position the vehicle by acquiring the positioning elements of the vehicle, but the positioning elements can only position the vehicle locally, and cannot position the vehicle globally, that is: only the relative position of the vehicle and surrounding objects can be detected, but the latitude and longitude coordinates of the vehicle cannot be detected. Because the present disclosure adopts the technical means of determining the initial position using the identification element and adjusting the initial position using the non-identification elements, it overcomes the technical problem that it can only position the vehicle locally and cannot position the vehicle globally in the related art, and thus achieving the technical effect of accurately determining the latitude and longitude coordinates of the vehicle and effectively improving a positioning accuracy; in addition, the technical solution of the embodiments of the present disclosure is simple and convenient to implement, easy to popularize, and has a wider application range.

Third Embodiment

Figure 4:
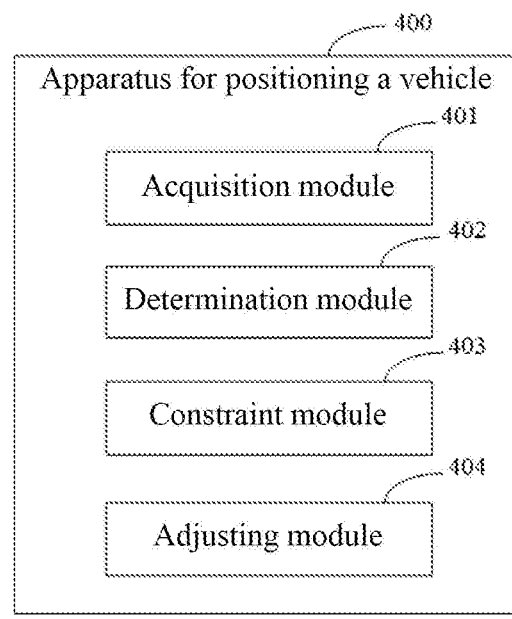
FIG. 4 is a schematic structural diagram of an apparatus for positioning a vehicle according to a third embodiment of the present disclosure.

FIG. 4 is a schematic structural diagram of an apparatus for positioning a vehicle according to the third embodiment of the present disclosure. As shown in FIG. 4, the apparatus 400 includes: an acquisition module 401, a determination module 402, a constraint module 403 and an adjusting module 404.

The acquisition module 401, is configured to acquire an identification element and non-identification elements of a current vehicle; the determination module 402, is configured to match the identification element of the current vehicle with position elements in a high-precision map to determine an initial position of the current vehicle; the constraint module 403, is configured to use at least one position element in the high-precision map to perform observational constraints on the non-identification elements of the current vehicle to acquire position elements corresponding to the non-identification elements of the current vehicle; and the adjusting module 404, is configured to adjust the initial position of the current vehicle using the position elements corresponding to the non-identification elements of the current vehicle to obtain a target position of the current vehicle.

Figure 5:
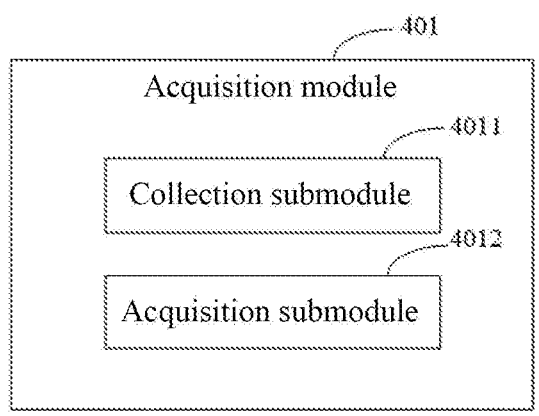
FIG. 5 is a schematic structural diagram of an acquisition module according to a third embodiment of the present disclosure.

FIG. 5 is a schematic structural diagram of an acquisition module according to the third embodiment of the present disclosure. As shown in FIG. 5, the acquisition module 401 includes: a collection submodule 4011 and an acquisition submodule 4012.

The collection submodule 4011, is configured to collect environment images of the current vehicle in four directions using four fisheye sensors provided on the current vehicle; where, the four fisheye sensors on the current vehicle are respectively provided in the four directions of front, rear, left, and right of the current vehicle; the acquisition submodule 4012, is configured to stitch the environment images of the current vehicle in the four directions collected using the fisheye sensors into a surround-view fisheye image; and input the surround-view fisheye image into a deep neural network, and output the identification element and the non-identification elements of the current vehicle through the deep neural network.

Further, the determination module 402 is specifically configured to determine at least one reference initial position in the high-precision map based on the identification element of the current vehicle; and calculate a matching degree between the identification element of the current vehicle and each of the at least one reference initial position, and determine a reference initial position having the highest matching degree as the initial position of the current vehicle.

Figure 6:
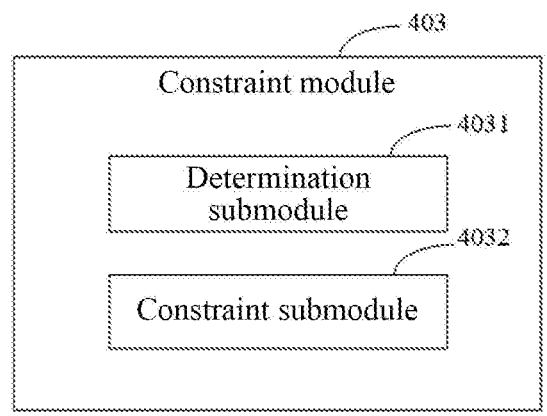
FIG. 6 is a schematic structural diagram of a constraint module according to the third embodiment of the present disclosure.

FIG. 6 is a schematic structural diagram of a constraint module according to the third embodiment of the present disclosure. As shown in FIG. 6, the constraint module 403 includes: a determination submodule 4031 and a constraint submodule 4032.

The determination submodule 4031, is configured to select a non-identification element in the non-identification elements of the current vehicle as a current non-identification element, and determine at least one position element corresponding to the current non-identification element in the high-precision map based on the current non-identification element; and the constraint submodule 4032, is configured to perform point and point observational constraints on the current non-identification element and the corresponding position element, if the current non-identification element is a point element and the corresponding position element is a point original element, to acquire the position element corresponding to the current non-identification element; or, perform point and line observational constraints on the current non-identification element and the corresponding position element, if the current non-identification element is a line element and the corresponding position element is a point original element, or, if the current non-identification element is a point element and the corresponding position element is a point and line element, to acquire the position element corresponding to the current non-identification element; and repeatedly perform above operations until the position elements corresponding to the non-identification elements of the current vehicle are acquired.

Further, the acquisition module 401 is further configured to collect inertial measurement data and wheel speed data of the current vehicle respectively using an inertial measurement unit sensor and a wheel speed sensor provided on the current vehicle; and the adjusting module 404, is further configured to adjust the target position of the current vehicle using the inertial measurement data and the wheel speed data of the current vehicle, to obtain a final position of the current vehicle.

The above apparatus for positioning a vehicle may perform the method provided in any embodiment of the present disclosure, and has the corresponding functional modules and beneficial effects for performing the method. For technical details not described in detail in the present embodiment, reference may be made to the method for positioning a vehicle provided in any embodiment of the present disclosure.

Fourth Embodiment

According to an embodiment of the present disclosure, the present disclosure further provides an electronic device and a readable storage medium.

Figure 7:
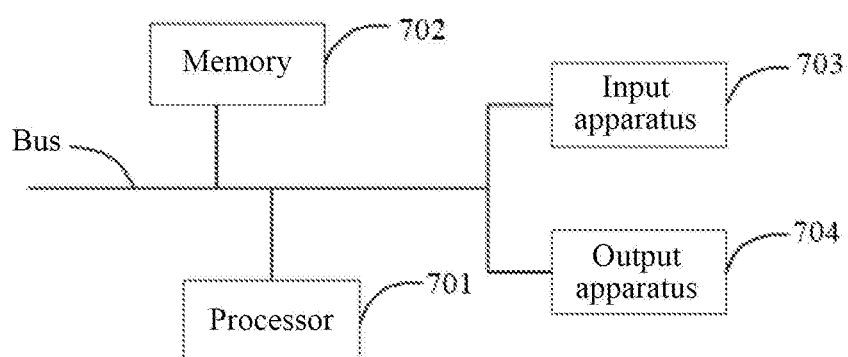
FIG. 7 is a block diagram of an electronic device for implementing the method for positioning a vehicle according to some embodiments of the present disclosure.

As shown in FIG. 7, which is a block diagram of an electronic device of the method for positioning a vehicle according to some embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a group of blade servers, or a multi-processor system). In FIG. 7, one processor 701 is used as an example.

The memory 702 is a non-transitory computer readable storage medium provided by the present disclosure. The memory stores instructions executable by at least one processor, so that the at least one processor performs the method for positioning a vehicle provided by the present disclosure. The non-transitory computer readable storage medium of the present disclosure stores computer instructions for causing a computer to perform the method for positioning a vehicle provided by the present disclosure.

The memory 702, as a non-transitory computer readable storage medium, may be used to store non-transitory software programs, non-transitory computer executable programs and modules, such as program instructions/modules corresponding to the method for positioning a vehicle in the embodiments of the present disclosure (for example, the acquisition module 401, the determination module 402, the constraint module 403 and the adjusting module 404 shown in FIG. 4). The processor 701 executes the non-transitory software programs, instructions, and modules stored in the memory 702 to execute various functional applications and data processing of the server, that is, to implement the method for positioning a vehicle in the foregoing method embodiments.

The memory 702 may include a program storage area and a data storage area. The program storage area may store an operating system and an application required for at least one function. The data storage area may store data and the like created according to the usage of a terminal device. In addition, the memory 702 may include a high-speed random access memory, and may also include a non-volatile memory, e.g., at least one disk storage device, a flash memory device or other non-volatile solid-state storage devices. In some embodiments, the memory 702 may further include memories remotely arranged relative to the processor 701, where the remote memories may be connected to the electronic device for positioning a vehicle by a network. An example of the above network includes but not limited to, the Internet, an enterprise intranet, a local area network, a mobile communications network, and a combination thereof.

The electronic device of the method for positioning a vehicle may further include: an input apparatus 703 and an output apparatus 704. The processor 701, the memory 702, the input apparatus 703, and the output apparatus 704 may be connected through a bus or in other methods. In FIG. 7, connection through a bus is used as an example.

The input apparatus 703 may receive input digital or character information, and generate key signal inputs related to user settings and function control of the electronic device of the method for positioning a vehicle, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of the embodiments of the present disclosure, first acquiring an identification element and non-identification elements of a current vehicle; then matching the identification element of the current vehicle with position elements in a high-precision map to determine an initial position of the current vehicle; next using at least one position element in the high-precision map to perform observational constraints on the non-identification elements of the current vehicle to acquire position elements corresponding to the non-identification elements of the current vehicle, and adjusting the initial position of the current vehicle using the position elements corresponding to the non-identification elements of the current vehicle to obtain a target position of the current vehicle. That is, the present disclosure may determine the initial position of the current vehicle by matching the identification element of the current vehicle with the position elements in the high-precision map; then adjust the initial position of the current vehicle using the position elements corresponding to the non-identification elements of the current vehicle to obtain the target position of the current vehicle, thereby achieving the purpose of accurately determining the latitude and longitude coordinates of the vehicle. The three vehicle positioning solutions in the related art all position the vehicle by acquiring the positioning elements of the vehicle, but the positioning elements can only position the vehicle locally, and cannot position the vehicle globally, that is: only the relative position of the vehicle and surrounding objects can be detected, but the latitude and longitude coordinates of the vehicle cannot be detected. Because the present disclosure adopts the technical means of determining the initial position using the identification element and adjusting the initial position using the non-identification elements, it overcomes the technical problem that it can only position the vehicle locally and cannot position the vehicle globally in the related art, and thus achieving the technical effect of accurately determining the latitude and longitude coordinates of the vehicle and effectively improving a positioning accuracy; in addition, the technical solution of the embodiments of the present disclosure is simple and convenient to implement, easy to popularize, and has a wider application range.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for positioning a current vehicle, the method comprising:

acquiring an identification element and non-identification elements of the current vehicle, both the identification element and non-identification elements representing environmental information of the current vehicle;

matching the identification element of the current vehicle with position elements in a high-definition map to determine an initial position of the current vehicle;

using at least one position element in the high-definition map to perform observational constraints on the non-identification elements of the current vehicle to acquire position elements corresponding to the non-identification elements of the current vehicle;

adjusting the initial position of the current vehicle using the position elements corresponding to the non-identification elements of the current vehicle to obtain a target position of the current vehicle; and moving the current vehicle based at least in part on the target position of the current vehicle;

wherein the using at least one position element in the map to perform observational constraints on the non-identification elements of the current vehicle to acquire position elements corresponding to the non-identification elements of the current vehicle, includes:

selecting a non-identification element in the non-identification elements of the current vehicle as a current non-identification element, and determining at least one position element corresponding to the current non-identification element in the map based on the current non-identification element; and either performing point and point observational constraints on the current non-identification element and the corresponding position element, in response to that the current non-identification element is a point element and the corresponding position element is a point original element, to acquire the position element corresponding to the current non-identification element; or performing point and line observational constraints on the current non-identification element and the corresponding position element, in response to that the current non-identification element is a line element and the corresponding position element is a point original element, or, the current non-identification element is a point element and the corresponding position element is a point and line element, to acquire the position element corresponding to the current non-identification element; and repeatedly performing above operations until the position elements corresponding to the non-identification elements of the current vehicle are acquired.

2. The method according to claim 1, wherein the acquiring the identification element and non-identification elements of the current vehicle, comprises:

collecting environment images of the current vehicle in four directions using four fisheye sensors provided on the current vehicle; wherein, the four fisheye sensors on the current vehicle are respectively provided in the four directions of front, rear, left, and right of the current vehicle;

stitching the environment images of the current vehicle in the four directions collected using the fisheye sensors into a surround-view fisheye image; and inputting the surround-view fisheye image into a deep neural network, and outputting the identification element and the non-identification elements of the current vehicle through the deep neural network.

3. The method according to claim 1, wherein the matching the identification element of the current vehicle with position elements in the high-definition map to determine the initial position of the current vehicle, comprises:
- determining at least one reference initial position in the high-definition map based on the identification element of the current vehicle; and
- calculating a matching degree between the identification element of the current vehicle and each of the at least one reference initial position, and determining a reference initial position having a highest matching degree as the initial position of the current vehicle.

4. The method according to claim 1, further comprising:
- collecting inertial measurement data and wheel speed data of the current vehicle using an inertial measurement unit sensor and a wheel speed sensor provided on the current vehicle; and
- adjusting the target position of the current vehicle using the inertial measurement data and the wheel speed data of the current vehicle, to obtain a final position of the current vehicle.

5. An electronic device, comprising:
- at least one processor; and
- a memory, communicatively connected to the at least one processor; wherein,
- the memory stores instructions executable by the at least one processor, the instructions, when executed by the at least one processor, cause the at least one processor to perform operations, the operations comprising:
- acquiring an identification element and non-identification elements of a current vehicle, both the identification element and non-identification elements representing environmental information of the current vehicle;
- matching the identification element of the current vehicle with position elements in a high-definition map to determine an initial position of the current vehicle;
- using at least one position element in the high-definition map to perform observational constraints on the non-identification elements of the current vehicle to acquire position elements corresponding to the non-identification elements of the current vehicle;
- adjusting the initial position of the current vehicle using the position elements corresponding to the non-identification elements of the current vehicle to obtain a target position of the current vehicle; and
- moving the current vehicle based at least in part on the target position of the current vehicle;
- wherein the using at least one position element in the map to perform observational constraints on the non-identification elements of the current vehicle to acquire position elements corresponding to the non-identification elements of the current vehicle, includes:
- selecting a non-identification element in the non-identification elements of the current vehicle as a current non-identification element, and determining at least one position element corresponding to the current non-identification element in the map based on the current non-identification element; and
- performing point and point observational constraints on the current non-identification element and the corresponding position element, in response to that the current non-identification element is a point element and the corresponding position element is a point original element, to acquire the position element corresponding to the current non-identification element; or,
- performing point and line observational constraints on the current non-identification element and the corresponding position element, in response to that the current non-identification element is a line element and the corresponding position element is a point original element, or, the current non-identification element is a point element and the corresponding position element is a point and line element, to acquire the position element corresponding to the current non-identification element; and
- repeatedly performing above operations until the position elements corresponding to the non-identification elements of the current vehicle are acquired.

6. The electronic device according to claim 5, wherein the acquiring the identification element and non-identification elements of the current vehicle, comprises:
- collecting environment images of the current vehicle in four directions using four fisheye sensors provided on the current vehicle; wherein, the four fisheye sensors on the current vehicle are respectively provided in the four directions of front, rear, left, and right of the current vehicle;
- stitching the environment images of the current vehicle in the four directions collected using the fisheye sensors into a surround-view fisheye image; and
- inputting the surround-view fisheye image into a deep neural network, and outputting the identification element and the non-identification elements of the current vehicle through the deep neural network.

7. The electronic device according to claim 5, wherein the matching the identification element of the current vehicle with position elements in the high-definition map to determine the initial position of the current vehicle, comprises:
- determining at least one reference initial position in the high-definition map based on the identification element of the current vehicle; and
- calculating a matching degree between the identification element of the current vehicle and each of the at least one reference initial position, and determining a reference initial position having a highest matching degree as the initial position of the current vehicle.

8. The electronic device according to claim 5, wherein the operations further comprise:
- collecting inertial measurement data and wheel speed data of the current vehicle using an inertial measurement unit sensor and a wheel speed sensor provided on the current vehicle; and
- adjusting the target position of the current vehicle using the inertial measurement data and the wheel speed data of the current vehicle, to obtain a final position of the current vehicle.

9. A non-transitory computer readable storage medium, storing computer instructions, the computer instructions, when executed by a computer, cause the computer to perform operations, the operations comprising:
- acquiring an identification element and non-identification elements of a current vehicle, both the identification element and non-identification elements representing environmental information of the current vehicle;
- matching the identification element of the current vehicle with position elements in a high-definition map to determine an initial position of the current vehicle;
- using at least one position element in the high-definition map to perform observational constraints on the non-identification elements of the current vehicle to acquire position elements corresponding to the non-identification elements of the current vehicle;
- adjusting the initial position of the current vehicle using the position elements corresponding to the non-identification elements of the current vehicle to obtain a target position of the current vehicle; and moving the current vehicle based at least in part on the target position of the current vehicle;

wherein the using at least one position element in the map to perform observational constraints on the non-identification elements of the current vehicle to acquire position elements corresponding to the non-identification elements of the current vehicle, includes:

selecting a non-identification element in the non-identification elements of the current vehicle as a current non-identification element, and determining at least one position element corresponding to the current non-identification element in the map based on the current non-identification element; and performing point and point observational constraints on the current non-identification element and the corresponding position element, in response to that the current non-identification element is a point element and the corresponding position element is a point original element, to acquire the position element corresponding to the current non-identification element; or, performing point and line observational constraints on the current non-identification element and the corresponding position element, in response to that the current non-identification element is a line element and the corresponding position element is a point original element, or, the current non-identification element is a point element and the corresponding position element is a point and line element, to acquire the position element corresponding to the current non-identification element and repeatedly performing above operations until the position elements corresponding to the non-identification elements of the current vehicle are acquired.

10. The non-transitory computer readable storage medium according to claim 9, wherein the acquiring the identification element and non-identification elements of the current vehicle, comprises:

collecting environment images of the current vehicle in four directions using four fisheye sensors provided on the current vehicle; wherein, the four fisheye sensors on the current vehicle are respectively provided in the four directions of front, rear, left, and right of the current vehicle;

stitching the environment images of the current vehicle in the four directions collected using the fisheye sensors into a surround-view fisheye image; and inputting the surround-view fisheye image into a deep neural network, and outputting the identification element and the non-identification elements of the current vehicle through the deep neural network.

11. The non-transitory computer readable storage medium according to claim 9, wherein the matching the identification element of the current vehicle with position elements in the high-definition map to determine the initial position of the current vehicle, comprises:

determining at least one reference initial position in the high-definition map based on the identification element of the current vehicle; and calculating a matching degree between the identification element of the current vehicle and each of the at least one reference initial position, and determining a reference initial position having a highest matching degree as the initial position of the current vehicle.

12. The non-transitory computer readable storage medium according to claim 9, wherein the operations further comprise:

collecting inertial measurement data and wheel speed data of the current vehicle using an inertial measurement unit sensor and a wheel speed sensor provided on the current vehicle; and adjusting the target position of the current vehicle using the inertial measurement data and the wheel speed data of the current vehicle, to obtain a final position of the current vehicle.

\* \* \* \* \*